United States Patent
Shen et al.

(10) Patent No.: US 10,534,327 B2
(45) Date of Patent: Jan. 14, 2020

(54) METHOD FOR LONG-TERM OPTIMAL OPERATIONS OF INTERPROVINCIAL HYDROPOWER SYSTEM CONSIDERING PEAK-SHAVING DEMANDS

(71) Applicant: Dalian University of Technology, Dalian, Liaoning Province (CN)

(72) Inventors: Jianjian Shen, Dalian (CN); Chuntian Cheng, Dalian (CN); Lifei Sun, Dalian (CN); Chengguo Su, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/322,829

(22) PCT Filed: Jul. 6, 2017

(86) PCT No.: PCT/CN2017/092122
§ 371 (c)(1),
(2) Date: Feb. 1, 2019

(87) PCT Pub. No.: WO2019/006733
PCT Pub. Date: Jan. 10, 2019

(65) Prior Publication Data
US 2019/0187637 A1    Jun. 20, 2019

(51) Int. Cl.
*G05B 13/04* (2006.01)
*G06Q 50/06* (2012.01)
(Continued)

(52) U.S. Cl.
CPC ............ *G05B 13/041* (2013.01); *E02B 9/02* (2013.01); *G06Q 10/06315* (2013.01); *G06Q 50/06* (2013.01)

(58) Field of Classification Search
CPC ............ G05B 13/041; G06Q 10/04; G06Q 10/06315; G06Q 50/06; E02B 9/02
(Continued)

(56) References Cited

U.S. PATENT DOCUMENTS 9,811,061 B1 * 11/2017 Hu .................. G06Q 50/06
2011/0066258 A1 * 3/2011 Torzhkov ............ G05B 13/042
700/29
(Continued)

FOREIGN PATENT DOCUMENTS

CN    102034159 A    4/2011
CN    104063808 A    9/2014
(Continued)

OTHER PUBLICATIONS

J. Shen, Q. Shen, S. Wang, J. Lu and Q. Meng, "Generation Scheduling of a Hydrothermal System Considering Multiple Provincial Peak-Shaving Demands," in IEEE Access, vol. 7, pp. 46225 46239, Apr. 4, 2019, retrieved from the Internet, [retrieved on Aug. 8, 2019] (Year: 2019).*
(Continued)

*Primary Examiner* — Kenneth M Lo
*Assistant Examiner* — Mohammed Shafayet
(74) *Attorney, Agent, or Firm* — Muncy, Geissler, Olds & Lowe, P.C.

(57) ABSTRACT

The invention that relates to the field of hydropower scheduling presents a method for long-tens optimal operations of interprovincial hydropower system considering peak-shaving demands. It can take full advantage of the differences of hydrological characteristics among hydropower plants on different rivers to implement compensation operations of interprovincial hydropower system. In this operation, typical daily load demands during dry season are considered to
(Continued)

optimize the allocation of hydropower production over one year. The purpose is to increase the dispatchable generation capacity for peak demands of power grids. The technology scheme of the invention can be summarized as follows. A multi-objective model of hydropower system operations is established with maximizing generation production and minimizing the difference rate between peak and valley load during dry period. The difference of hydrological characteristics and regulation performance between rivers and plants are utilized to divide all power plants into several groups and their calculation order. A hybrid algorithm that integrating progressive optimality algorithm and discrete differential dynamic programming is presented to optimize monthly reservoir levels of hydropower plants. During optimization, a load reconstruction-based strategy is used to handle time-coupled network security constraints so that feasible hourly generation schedules far peak-shaving are easily obtained. An iterative procedure is executed to obtain the optimal monthly generation schedules and hourly power curves at the typical day of each month. The invention can make full use of the compensation operation characteristics of hydropower plants to meet the demands of coordinating monthly generation production and daily peak power. It is capable of providing the support for interprovincial power transmission and joint operations of China's huge hydropower plants such as Xiluodu and Jinping.

1 Claim, 4 Drawing Sheets

(51) Int. Cl.
*G06Q 10/06* (2012.01)
*E02B 9/02* (2006.01)

(58) Field of Classification Search
USPC .......................................................... 700/287
See application file for complete search history.

(56) References Cited

U.S. PATENT DOCUMENTS

| | | | |
|---|---|---|---|
| 2012/0191426 A1* | 7/2012 | Kalich | G06Q 10/04 703/2 |
| 2013/0090774 A1* | 4/2013 | Kalich | G06F 17/5086 700/287 |
| 2016/0190805 A1* | 6/2016 | Steven | G06Q 30/0283 700/291 |
| 2016/0218505 A1* | 7/2016 | Krupadanam | H02J 3/005 |
| 2017/0039659 A1* | 2/2017 | Liu | G06Q 50/06 |

FOREIGN PATENT DOCUMENTS

| | | |
|---|---|---|
| CN | 104537445 A | 4/2015 |
| CN | 106786790 A | 5/2017 |

OTHER PUBLICATIONS

J. Shen, C. Cheng, J. Zhang, J. Lu, "Peak Operation of Cascaded Hydropower Plants Serving Multiple Provinces," in semanticscholar. org, vol. 8, issue 10, pp. 11295-11314, Oct. 13, 2015,retrieved from the Internet, [retrieved on Aug. 8, 2019] (Year: 2015).*

X. Wu, C. Cheng, J. Shen, B. Luo, S. Liao, G. Li, "A multi-objective short term hydropower scheduling model for peak shaving," sciencedirect.com, vol. 68, pp. 278-293, 2015, retrieved from the internet on Oct. 8, 2019. (Year: 2015).*

Wu et al., Long-Term Hydropower Optimal Operation for Peak Load Regulating of Typical Days, World Environmental and Water Resources Congress 2013: Showcasing the Future, May 31, 2013, p. 2190-2199.

* cited by examiner

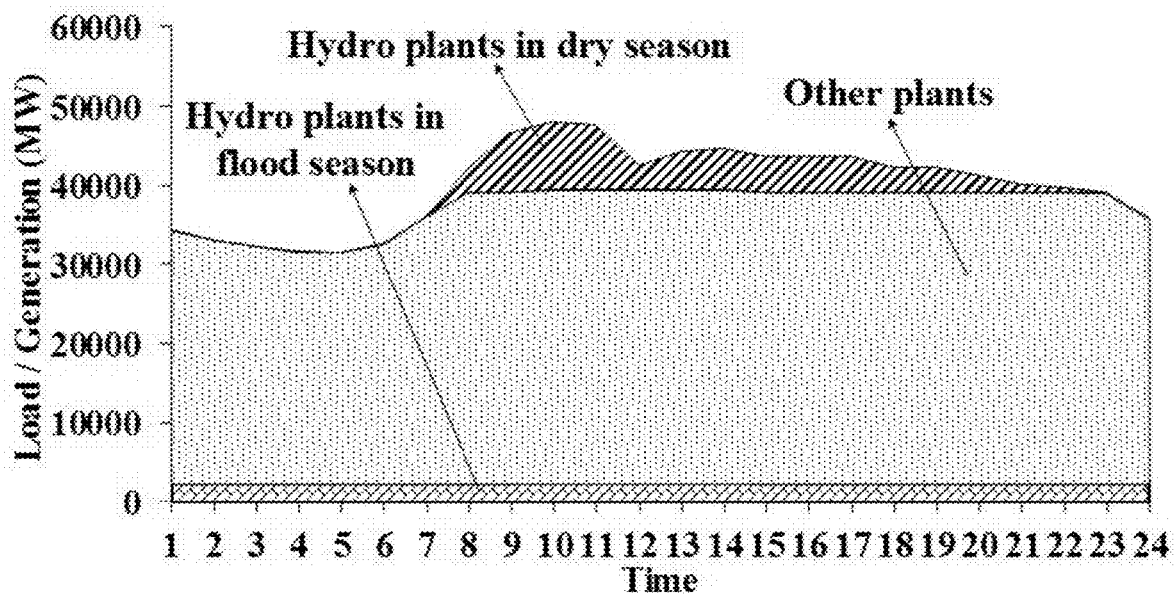
Fig. 1
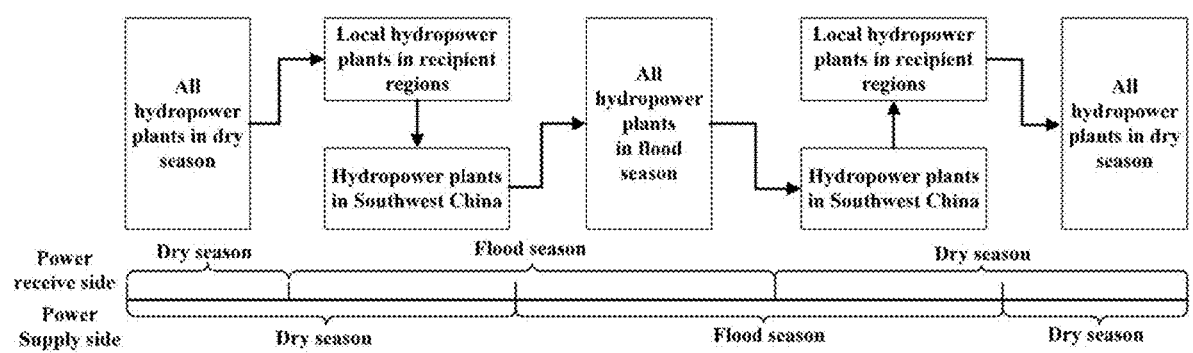
Fig. 2 (Fig.2 as an illustration in Abstract)

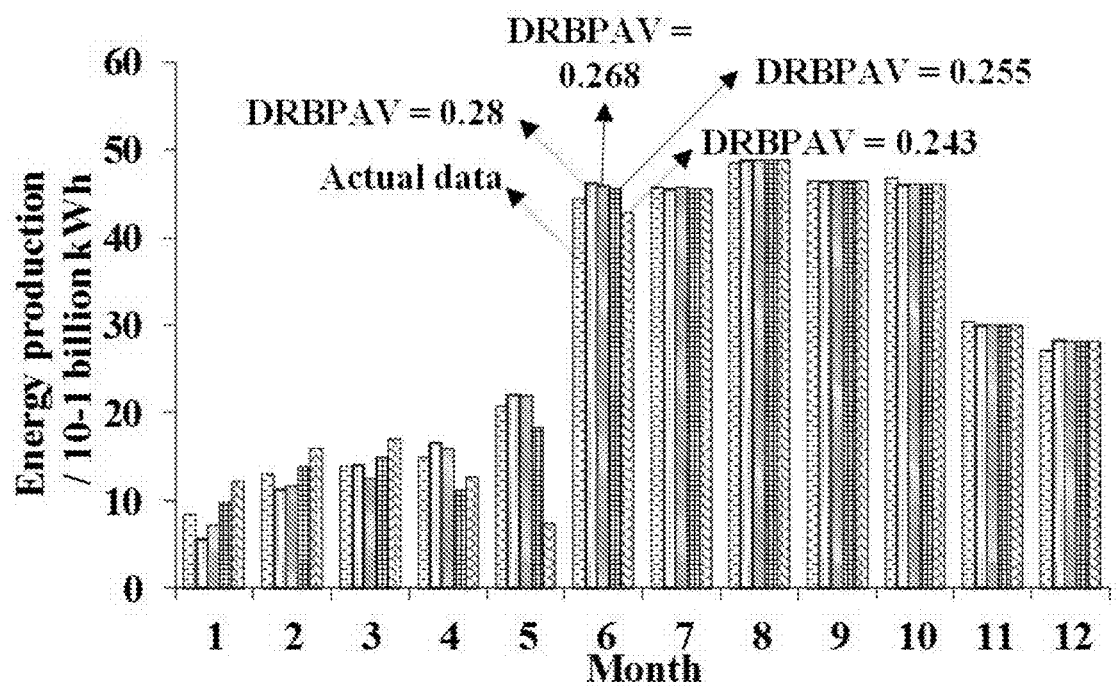
Fig. 5 (DRBPAV is the difference rate between peak and valley load during dry period)
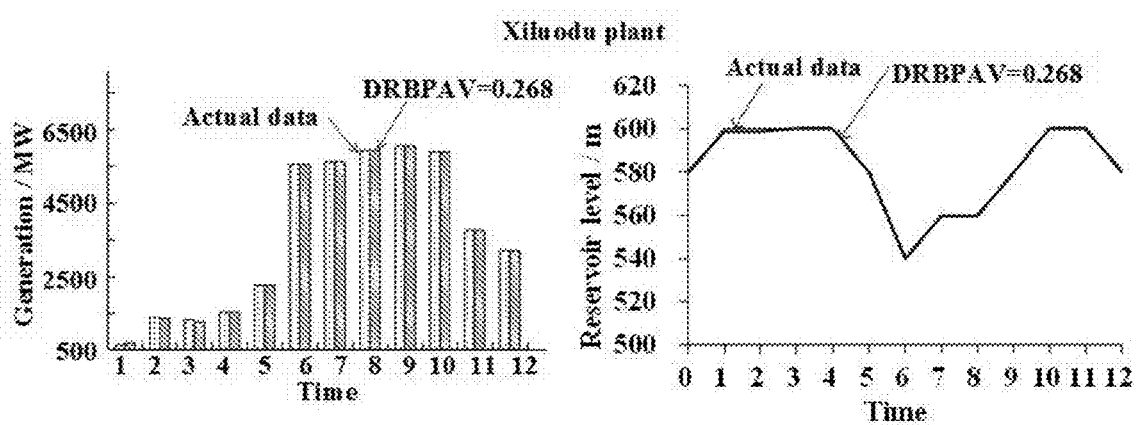
Fig. 6 (DRBPAV is the difference rate between peak and valley load during dry period)

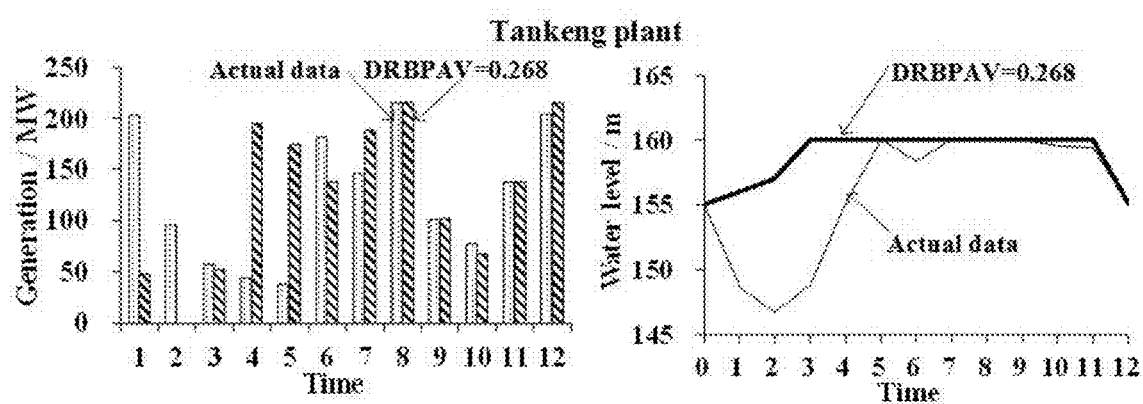
Fig. 7 (DRBPAV is the difference rate between peak and valley load during dry period)

METHOD FOR LONG-TERM OPTIMAL OPERATIONS OF INTERPROVINCIAL HYDROPOWER SYSTEM CONSIDERING PEAK-SHAVING DEMANDS

TECHNICAL FIELD

The invention relates to the field of hydropower generation, focusing on a method for long-term optimal operations of interprovincial hydropower system considering peak-shaving demands.

BACKGROUND TECHNOLOGY

The scale of hydropower transmission across provinces has expanded dramatically along with the operations of a batch of giant hydropower plants in mainstreams of large basin rivers such as Jinsha River, Yalong River and Lancang River in recent years. Now the maximum transmission capacity exceeds 68GW, which means the southwestern hydropower has been an important power source for the recipient power grids. These southwestern hydropower plants and local ones in recipient regions form a very complex interprovincial hydropower system to meet the electricity demands such as power supply and load regulation. It brings new challenges and difficulties to the operation and management of power grids. The hydropower plants located in southwest and east regions usually own respective peculiarity in the aspects of geography, weather, hydrology, etc., which easily leads to greatly different run-off. Moreover, the coupled hydraulic and electric connections impose additional difficult on the problem description and solution. On the other hand, the interprovincial hydropower system needs to meet discrepant operation requirements of power grids and power plants. Specifically, coordinating electricity production over a long period of time and peak power in daily operation is just a primary and new challenge.

More and more attention has been paid to the study of trans-provincial and trans-regional hydropower scheduling with quickly increasing scale of ultra high voltage direct current power transmission. Some researches focused on the operations of cascaded hydropower plants serving multiple provinces. For instance, the hydropower plants on the mainstream of Hongshui River supplies electricity to Guangdong Province and Guangxi Province. The downstream hydropower plants on Jinsha River provide electricity for Guangdong Province and Zhejiang Province. A few studies placed emphasis on the power allocation among multiple power grids under a central dispatching authority (which is usually regional power grids). These previous literatures mainly concern with the optimization allocation of large-scale southwestern hydropower and operations of hydropower plants considering complex load demands from multiple power grids. Little attention is paid to the joint operations of southwest hydropower plants and local ones in recipient regions, and the consideration of operation requirements with two coupled temporal scales. This problem is a technical bottleneck of large-scale hydropower transmission and distribution in China. There is an urgent need for feasible and practical theoretical method and technology.

The invention derives from the National Natural Science Foundation of China (91547201, 51579029), which is based on an actual UHVDC transmission project that is Xiluodu provides electricity for Zhejiang Province. It simultaneously takes into account the monthly and hourly generation scheduling. A new method for the long-term operations for interprovincial hydropower system with peak-shaving demands is developed.

Contents of the Invention

What the invention aims at solving are long-term optimal operations of interprovincial hydropower system with peak-shaving demands. The developed method can simultaneously consider two coupled temporal scales that are monthly and hourly steps. It should be emphasized that the daily peak-shaving pressure facing power grids is solved at the first time from a long-term perspective. Furthermore, the peak-shaving effect can be utilized to optimize the monthly distribution of the total hydropower production, which is beneficial to improving the consistency of making long-term and short-term schemes of hydropower system operations and power transmission.

The Technical Procedure of the Invention:

Step 1. Read basic data and initialize calculation parameters, including operation conditions and constraints of hydropower plants, control targets, network constrains about UHVDC transmission lines, monthly average load of recipient power grids, and hourly load curve at the typical day of each month.

Step 2. Establish an optimization model for long-term operations of interprovincial hydropower plants, with two objectives of maximizing generation production and minimizing the difference rate between peak and valley load (DRBPAV) during dry period.

Step 3. Determine initial solution of the above model. An optimization problem with one objective of maximizing generation production is solved and its solution is taken as the initial solution. Here, the DRBPAV at each typical day of dry season can be calculated and the maximum among them is denoted as $R_0$; Upper bound of the DRBPAV during dry period is denoted as R. Set $R=R_0$. Step 4. Set $R=R_0-0.01$.

Step 5. Set iteration number k=0.

Step 6. Let current time period t=1, and define T as total number of time periods during whole operation horizon.

Step 7. Divide all hydropower plants into N groups.

Step 8. This step is carried out while k>0. If there is change in reservoir levels obtained from the two-stage search optimization, reset the discharge step and go to Step 9; Otherwise, update t=t+1; If t>T, go to Step 15; Otherwise, repeat the current step.

Step 9. Judge whether a hydropower plant involved in the calculation is in a flood season. If so, the calculation will be given priority; otherwise, it will be carried out after the plants that are in a flood season are solved. The order of a plant group with the highest priority is defined as n=0.

Step 10. Process the upper bound of the DRBPAV, transmission limitations, and conventional plant constraints, and utilize the POA-DDDP based method (POA is progressive optimality algorithm and DDDP is discrete differential dynamic programming) to search optimal discharges of two-stage problem at periods t and t+1 with current optimization objective. Meanwhile, the load shedding method is used to determine the hourly generation curve at typical days. Thus, the $R_t$ and $R_{t+1}$ at periods t and t+1 can be obtained; where $R_t$ is upper bound of the DRBPAV during dry period at period t, and $R_{t+1}$ is upper bound of the DRBPAV during dry period at period t+1.

Step 11. Set n=n+1. If n<N, then repeat Step 10; otherwise, go to Step 12.

Step 12. Repeat from Step 9 to Step 11. Determine whether there is any change of reservoir levels of hydropower plants in two adjacent optimization results; if not, then go to Step 13, otherwise repeat Step 12.

Step 13. Reduce the discharge step, and determine whether a new search step meets specified requirements. If so, go to Step 9; otherwise, go to Step 14.

Step 14. Let t=t+1, and if t>T, let k=k+1 and go to Step 15; otherwise, go back to Step 8.

Step 15. Judge whether there is any change of reservoir levels of all hydropower plants in the current iteration; if not, go to Step 16; otherwise, go back to Step 6.

Step 16. Calculate the maximum DRBPAV using $R_{max}=\max\{R_{t'}\}$, where t' is a period set that denotes all months in dry season.

Step 17. If $R_{max}$<R, take operation scheme as a feasible one and then go back to Step 4; otherwise, the calculation stops.

Compared with existing technology, the method developed in the invention can achieve significant effects. This method can take full advantage of the differences of hydrological characteristics among hydropower plants on different rivers to implement compensation operations of interprovincial hydropower system. In this operation, typical daily load demands during dry season are considered to optimize the allocation of hydropower production over one year. It aims to coordinate monthly and hourly generation schedules by using two optimization objectives so that the response to peak demands is improved effectively. In addition, the method is also a practical way for large-scale power transmission via UHVDC grid network across regions and provinces in China as it is developed on the base of the existing operation mode.

DESCRIPTION OF FIGURES

FIG. 1. Generation range of hydropower plant in the typical days of flood and dry season.

FIG. 2. The calculation order of different plant groups.

FIG. 5. Monthly power generation profile of hydropower plants.

FIG. 6. Comparisons of reservoir levels and generation of Xiluodu plant between the optimization scheme and the actual operation scheme.

FIG. 7. Comparisons of reservoir levels and generation of Tankeng plant between the optimization scheme and the actual operation scheme.

SPECIFIC IMPLEMENTATION

Figure 3:
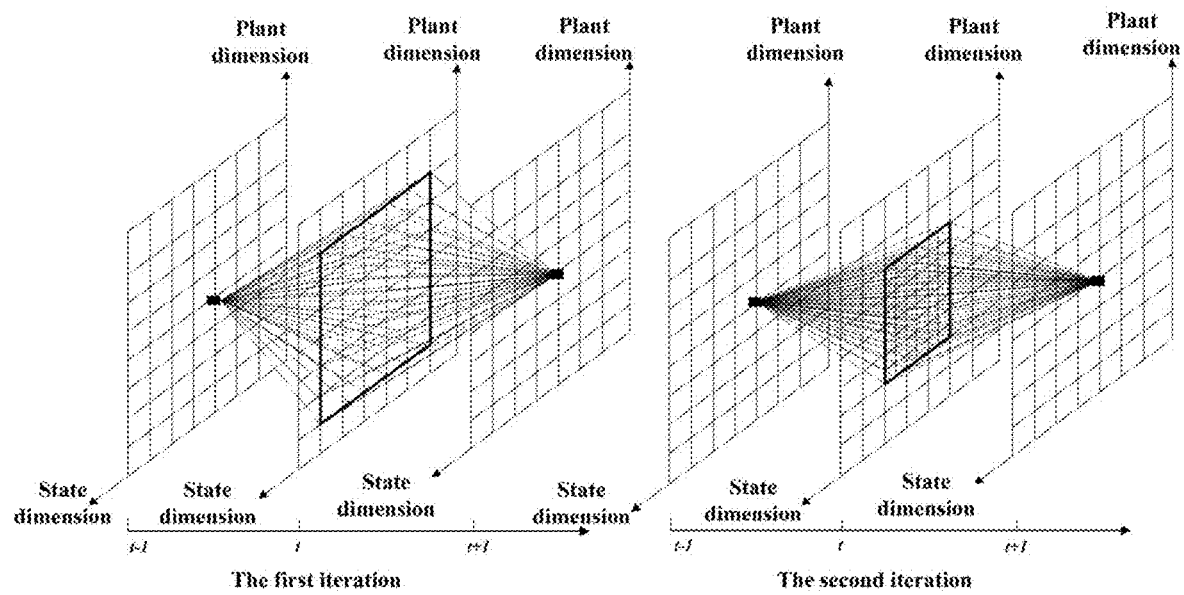
FIG. 3. The search procedure of two-stage subproblem using the POA-DDDP based method.

The invention relates to a method for long-term optimal operations of interprovincial hydropower system considering peak-shaving demands. The detailed descriptions on the invention are presented by the following procedures and case study.

The optimal operations of interprovincial hydropower system are affected by the load demands characteristics in different temporal scales, network security constraints of UHVDC transmission lines, hydropower plant and reservoir constraints, unit maintenance and many other factors. More specifically, there are four key problems to be solved. The first is to develop an optimal operation model of interprovincial hydropower system. The second is how to make full use of hydrological differences of hydropower plants in different regions and rivers. The third is to hourly operation constraints about transmission lines and plants in the long-term optimal operation. The fourth is to develop an effective and efficient method for solving the optimization of interprovincial hydropower system operation. The following gives the solutions to the four problems.

(a) The Optimal Operation Model of Interprovincial Hydropower System

Generally, the goal of long-term optimal operation of hydropower plants is to determine monthly generation profile and reservoir levels over the time horizon. The time horizon is usually one year, with monthly time step. Compared to the conventional hydropower optimization problem, the operations of interprovincial hydropower plants involve complex network security constraints and system conditions except the basic plant and reservoir operation constraints. Such spatial-temporal constraints impose great difficulties on the model formulation and solution. The invention takes into consideration these constraints in formulating the optimization model. Two objectives of maximizing generation production and minimizing the difference rate between peak and valley load during dry period are utilized to meet the demands of hydropower distribution and peak load response.

The objective function is shown as follows:

Objective 1: Maximizing generation production $$F_1 = \text{Max}\left\{\sum_{m=0}^{M_1}\sum_{t=0}^{T} p_{m,t} \times \Delta t + \sum_{m=0}^{M_2}\sum_{t=0}^{T} p_{m,t} \times \Delta t\right\} \quad (1)$$

Objective 2: Minimizing the difference rate between peak and valley load (DRBPAV) during dry period The DRBPAV index reflects the requirement for peak-shaving of power grids. Generally, the smaller the DRBPAV of the remaining load (that is obtained by subtracting hydro generation from the original load) the hydropower optimization produces, the less peak-shaving pressure other coal-fired units faces. Thus, it is formulated as follow.

$$F_2 = \underset{i \in T_2}{\text{Min}}\left[\left(\underset{1 \le t \le I}{\text{Max}}\left(Cday_{i,t} - \sum_{m=1}^{M} pday_{m,i,t}\right) - \underset{1 \le i \le I}{\text{Min}}\left(Cday_{i,t} - \sum_{m=1}^{M} pday_{m,i,t}\right)\right) \middle/ \underset{1 \le i \le I}{\text{Max}}\left(Cday_{i,t} - \sum_{m=1}^{M} pday_{m,i,t}\right)\right] \quad (2)$$

where $F_1$ and $F_2$ are the two objectives considered in the method; m denotes the plant index and M is the total number of plants; $M_1$, $M_2$ denotes the total number of hydropower plants in the recipient power grids and the southwestern regions, respectively; $\Delta t$ is the time period duration; T is the last time interval under consideration. $T_2$ denotes month set during dry season. i is period index in the typical day and I is the total period number in a typical day. $C_{day_{i,t}}$ represents the load at period i of typical day in month t, MW.

Long-Term Operation Constraint of Hydropower Plants (1) Reservoir level target:

$$Z_{m,T}=Z_m'  \qquad (3)$$

(2) Water balance $$V_{m,t+1} = V_{m,t} + (Q_{m,t} - q_{m,t} - qd_{m,t})\Delta_t \qquad (4)$$

$$\text{Here } Q_{m,t} = In_{m,t} + \sum_{k=1}^{K} S_{k,t} \qquad (5)$$

(3) Minimum and maximum discharge $$S_{m,t}^{min} \leq S_{m,t} \leq S_{m,t}^{max} \qquad (6)$$

(4) Turbine discharge limitation $$q_{m,t} \leq q_{m,t}^{max} \qquad (7)$$

(5) Minimum and maximum reservoir level constraint $$Z_{m,t}^{min} \leq Z_{m,t} \leq Z_{m,t}^{max} \qquad (8)$$

(6) Minimum and maximum power generation capacity $$p_{m,t}^{min} \leq p_{m,t} \leq p_{m,t}^{max} \qquad (9)$$

(7) The maximum spill discharge $$qd_{m,t} \leq \bar{q}_{m,t} \qquad (10)$$

where $V_{m,t}$ is the total storage volume of plant m at the end of period t; $Q_{m,t}$ represents inflow into plant m during period t; $q_{m,t}$ denotes turbine discharge of plant m during period t; K denotes total number of immediate upstream plants for hydropower plant m; k is the upstream plant index; $In_{m,t}$ means average local inflow of plant m during period t. $S_{k,t}$ represents the total discharge of the k th upstream power plant m during period t; $qd_{m,t}$ is spill of plant m during period t; $\Delta t$ is the time period duration; $Z_{m,t}$ represents reservoir level of plant m at the end of time horizon; $q_{m,t}^{max}$ represents the upper limit of turbine capacity of plant m during period t; $S_{m,t}$ denotes total discharge of plant m during period t; $S_{m,t}^{max}$ and $S_{m,t}^{min}$ represent the upper and lower limits of total discharge of plant m during period t, respectively; $Z_{m,t}$ represents the reservoir level of plant m at the end of period t; $Z_{m,t}^{max}$ and $Z_{m,t}^{min}$ respectively represent the upper and lower limits of reservoir level of plant m at the end of period t; $p_{m,t}$ represents power generation of plant m during period t; $p_{m,t}^{max}$ and $p_{m,t}^{min}$ respectively denote maximum and minimum of power generation of plant m during period t; $\bar{q}_{m,t}$ represents maximum spill discharge of reservoir m during period t.

Daily Operation Constraints of Hydropower Plants (1) Typical daily capacity constraints $$E_{m,t}=E_{m,t}' \qquad (11)$$

where $E_{m,t}$ and $E_{m,t}'$ represent the calculated energy production and the given target of typical day at period t, respectively. Here, the $E_{m,t}'$ is calculated:

$$E_{m,t}' = P_{m,t} \times \sum_{i=1}^{24} Cday_{i,t}/C_t \qquad (12)$$

where $C_t$ represents the average load demand at period t.

(2) The upper and lower limit of power generation of typical day $$Pday_{m,i,t}^{min} \leq Pday_{m,i,t} \leq Pday_{m,i,t}^{max} \qquad (13)$$

where $Pday_{m,i,t}^{max}$ and $Pday_{m,i,t}^{min}$ represent the upper and lower limit of power generation of typical day at period t, respectively.

(3) Maximum ramping capacity of typical day $$|Pday_{m,i,t}-Pday_{m,i-1,t}| \leq \Delta Pday_m \qquad (14)$$

where $\Delta Pday_m$ denotes maximum ramping capacity of plant m.

(4) Requirement for power generation stability of typical day $$(Pday_{m,i-\Delta+1,t}-Pday_{m,i-\Delta,t})(Pday_{m,i,t}-Pday_{m,i-1,t}) \geq 0$$
$$\Delta=1,2,\ldots v_m \qquad (15)$$

where $v_m$ represents minimum number of time periods where the power generation is a local extreme.

Operation constraints of DC transmission lines (1) Upper and lower limits of transmission power $$Pl_{m,i,t}^{min} \leq \sum_{m=0}^{M_2} Pday_{m,i,t} \leq Pl_{m,i,t}^{max} \qquad (16)$$

where $Pl_{m,i,t}^{max}$ and $Pl_{m,i,t}^{min}$ represent the upper and lower limits of transmission power of DC of typical day i during period t, respectively.

(2) Maximum limit of variation of transmission power at two adjacent periods $$\sum_{m=0}^{M_2} Pday_{m,i,t-1} - \sum_{m=0}^{M_2} Pday_{m,i,t} \leq \Delta Pl_{m,t} \qquad (17)$$

where $\Delta Pl_{m,t}$ represents maximum limit of power variation of transmission line.

(3) Constraints on the duration of typical daily power transmission $$\left(\sum_{m=0}^{M_2} Pday_{m,i-\Delta+1,t} - \sum_{m=0}^{M_2} Pday_{m,i-\Delta,t}\right)\left(\sum_{m=0}^{M_2} Pday_{m,i,t} - \sum_{m=0}^{M_2} Pday_{m,i-1,t}\right) \geq$$
$$0, \Delta = 1, 2, \cdots v_l \qquad (18)$$

where $v_l$ represents the minimum continuous number of periods during which transmission power is a local extreme.

(b) Method for the Coordinated Operation with Different Hydrological Differences.

The interprovincial hydropower system covers several provinces, where different groups of hydropower plants exhibit obvious differences in hydrological characteristics. Usually, their dry and flood seasons are greatly different. In the invention, a multi-phase multi-group coordination method to divide the time horizon into multiple phases that reflects different hydrology season combinations of rivers. This method can help identify hydrology seasons of each phase and determine plant group. The plants that are in flood season should work at base load, whereas the plants in dry season are required to respond to peak demands. FIG. 1 shows the work positions of hydropower plants.

In this case, the hydropower plants in flood season are first optimized with the objective of generation production maximization. The other plants are then solved using the objective of the DRBPAV minimization. It should be noted that the typical load considered in the latter optimization problem is obtained by subtracting generation of the plants in flood season from the original load. It can be represented as:

$$Cday_{i,t}^{R1} = Cday_{i,t} - \sum_{m=0}^{M_1} Pday_{m,i,t} \quad (19)$$

With the obtained residual load $Cday_{i,t}^{R1}$ of typical day, the hourly generations of hydropower plants can be obtained, which are then further subtracted from $Cday_{i,t}^{R1}$ to determine the final residual load $Cday_{i,t}^{R2}$.

$$Cday_{i,t}^{R2} = Cday_{i,t}^{R1} - \sum_{m=0}^{M-M_{flood}} Pday_{m,i,t} \quad (20)$$

Thus, the upper limit of DRBPAV facing hydropower plants in dry season can be expressed as:

$$\left(\underset{1\leq i\leq I}{\operatorname{Max}} Cday_{i,t}^{R2} - \underset{1\leq i\leq I}{\operatorname{Min}} Cday_{i,t}^{R2}\right) \Big/ \underset{1\leq i\leq I}{\operatorname{Max}} Cday_{i,t}^{R2} < R_0 \quad (21)$$

where i is period index in typical day; t is month index; m is plant index; I is the total number of all periods in typical day; $R_0$ denotes the value of DRBPAV at one iteration; $M_{flood}$ represents the total number of plants in flood season; $Cday_{i,t}$ represents the original load at period i of typical day during month t; $Cday_{i,t}^{R1}$ represents the residual load after deducting the power generation $Pday_{m,i,t}$ of plants in flood season from $Cday_{i,t}$, and $Cday_{i,t}^{R2}$ represents the residual load after deducting power generation of all plants from $Cday_{i,t}$.

With the above solution procedure, FIG. 2 gives the calculation orders of different plant groups at all stages.

(c) Method for Treating Daily Operation Constraints of Hydropower Plants

For local hydropower plants in recipient provinces, the energy production of each plant at typical day can be obtained by the Eq. (12). Thus, the standard load shedding method can be used to determine the hourly generation profile of each plant subject to the constraints in Eqs. (11)~(15). In addition to the conventional constraints, the operation constraints of DC transmission lines in Eqs. (16)~(18) must be considered. These complex constraints make the load shedding method infeasible to directly determine the hourly generation profile at typical day. Therefore, the invention first reconstructs the load curve of typical day according to the operation constraints of DC transmission lines, and then employs the load shedding method to produce power generation profiles, which satisfy the operation constraints in Eqs. (11)~(18). The solution steps are as follows:

(1) Calculate the daily energy production of each hydropower plant using Eq. (12).

(2) Define a virtual power plant to replace hydropower plants that bear responsibility for power supply. Its daily energy target and operation constraints are shown as follows:

Daily energy target:

$$E_t = E_{1,t} + E_{2,t} + \ldots + E_{M,t}$$

The upper and lower limits of power generation:

$$\max\left\{\sum_{m=0}^{M_2} Pday_{m,i,t}^{min}, Pl_{m,i,t}^{min}\right\} \leq Pday_{virtual,i,t} \leq \min\left\{\sum_{m=0}^{M_2} Pday_{m,i,t}^{max}, Pl_{m,i,t}^{max}\right\}$$

Maximum ramping capacity:

$$|Pday_{virtual,i,t} - Pday_{virtual,i-1,t}| \leq \min\left\{\sum_{m=0}^{M_2} \Delta Pday_m, \Delta Pl_{,t}\right\}$$

Requirement for power generation stability of typical day:

$(Pday_{virtual,i-\Delta+1,t} - Pday_{virtual,i-\Delta,t})(Pday_{virtual,i,t} - Pday_{virtual,i-1,t}) \geq 0, \Delta=1, 2, \ldots v_{virtual}$ where $v_{virtual} = \max\{v_1, v_2, \ldots, v_{M_2}, v_1\}$, which the minimum continuous number of periods during which transmission power is a local extreme for the defined virtual power plant.

(3) With the original load curve of typical day, the load shedding method is used to determine the hourly generation profile $\{P_{1,t}, P_{2,t}, \ldots, P_{24,t}\}$.

(4) Actually, the defined virtual plant provides more peak power than its own hydropower plants. Therefore, the above hourly generations are further adjusted as $\{P_{1,t}+P_b, P_{2,t}+P_b, \ldots, P_{24,t}+P_b\}$. Reconstruct the load vector for the hydropower plants in sending side as $P_\alpha$. Here, $P_b$ denotes a fixed power that responds to a base load.

(5) The above $P_\alpha$ is used as load demands facing hydropower plants in sending side. Thus, the load shedding method can be utilized to calculate their hourly generations at typical day. The obtained results will satisfy all daily operation constraints of power plants and UHVDC lines.

(d) Optimization Method for Long-Term Operations of Hydropower Plants

Figure 4:
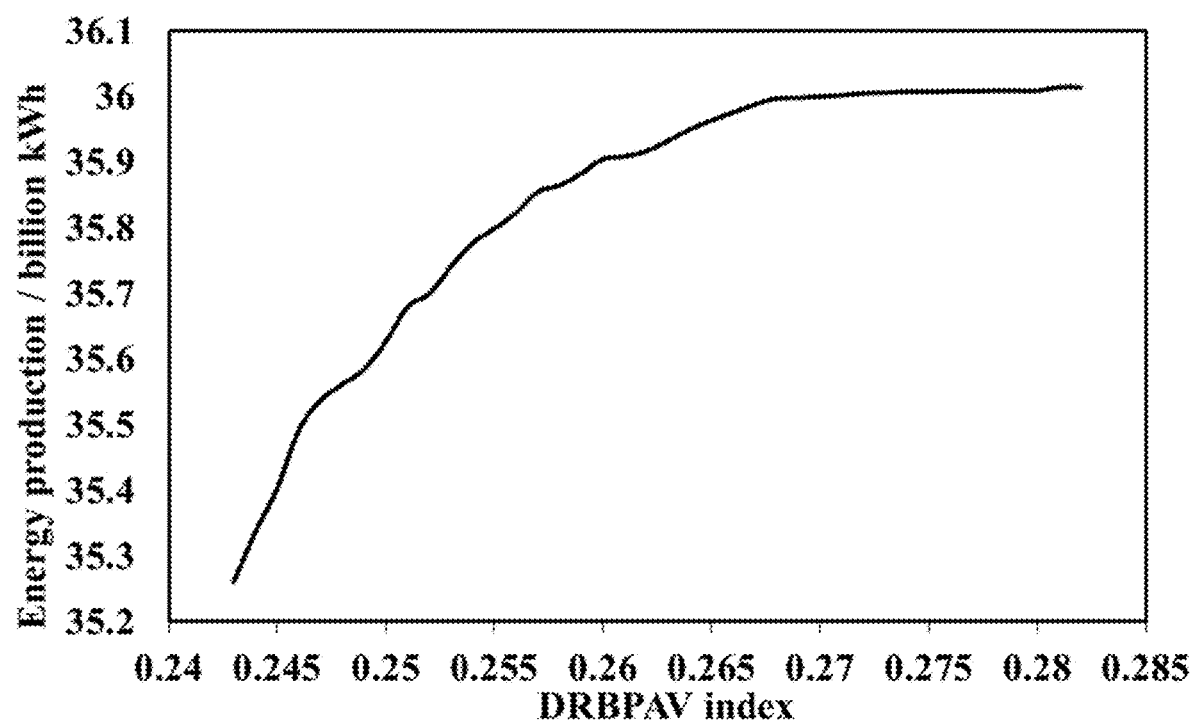
FIG. 4. Perato optimal solutions of multi-objective operation under the inflow scheme obtained by 50% frequency forecast.

In the invention, the POA-DDDP based method is used to solve the long-term operations of hydropower plants to obtain optimal reservoir levels over the time horizon. It divides the original problem into a series of two-stage subproblems. The main principle of the method is depicted in FIG. 4. The detailed solution procedure is given as follows:

(1) Set t=1, m=1, n=1;

(2) Fix the water levels of m th plant of group n at the beginning of period t and the ending of period t+1. The discharge $S_m^t$ is chosen as decision variable. Based on the initial discharge step ε, the discrete states of each plant can be produced. Suppose the discrete number is set to 3, the discrete values can be determined with $S_{m,k}^t = S_m^t + (2-k)\times\varepsilon$, k=1, 2, 3. So, all state combinations in the group is $3^{Mn}$.

(3) Calculate each state combination b(b=1, 2, \ldots, $3^{Mn}$) for the optimal discharge according to the sequence from upstream to downstream plants. In the calculation, for the hydropower plants in the group n, the discharge at period t and the water level at the end of period t+1 should be fixed. For the hydropower plants that don't belong to group n, the discharges at periods t and t+1 should be fixed. Depending on the obtained monthly generation, the load shedding method is used to update the hourly generations of typical day.

(4) Set m=m+1. If m is equal to the total number M of plants in the group n, n=n+1 and go to Step (5); otherwise, go back to Step (2).

(5) If n is equal to total number of station groups N, go to Step (6); otherwise, go back to Step (2).

(6) Update ε=ε/2, If ε meets the accuracy requirements, search process stops; otherwise, go back to Step (1).

(e) The Whole Solution Procedure

Combined with the solutions of the above key problems, the whole optimization procedure for long-term optimal operations for interprovincial hydropower plants considering peak-shaving demands can be described by the following step.

Step 1. Read basic data and initialize calculation parameters, including operation conditions and constraints of hydropower plants, control targets, network constrains about UHVDC transmission lines, monthly average load of recipient power grids, and hourly load curve at the typical day of each month.

Step 2. Establish an optimization model for long-term operations of interprovincial hydropower plants, with two objectives of maximizing generation production and minimizing the difference rate between peak and valley load (DRBPAV) during dry period.

Step 3. Determine initial solution of the above model. An optimization problem with one objective of maximizing generation production is solved and its solution is taken as the initial solution. Here, the DRBPAV at each typical day of dry season can be calculated and the maximum among them is denoted as $R_0$; Upper bound of the DRBPAV during dry period is denoted as R. Set R=$R_0$ Step 4. Set R=$R_0$−0.01.

Step 5. Set iteration number k=0.

Step 6. Let current time period t=1, and define T as total number of time periods during whole operation horizon.

Step 7. Divide all hydropower plants into N groups.

Step 8. This step is carried out while k>0. If there is change in reservoir levels obtained from the two-stage search optimization, reset the discharge step and go to Step 9; Otherwise, update t=t+1; If t>T, go to Step 15; Otherwise, repeat the current step.

Step 9. Judge whether a hydropower plant involved in the calculation is in a flood season. If so, the calculation will be given priority; otherwise, it will be carried out after the plants that are in a flood season are solved. The order of a plant group with the highest priority is defined as n=0.

Step 10. Process with the upper bound of the DRBPAV, transmission limitations, and conventional plant constraints, and utilize the POA-DDDP based method (POA is progressive optimality algorithm and DDDP is discrete differential dynamic programming) to search optimal discharges of two-stage problem at periods t and t+1 with current optimization objective. Meanwhile, the load shedding method is used to determine an hourly generation curve at typical days. Thus, the $R_t$ and $R_{t+1}$ at periods t and t+1 can be obtained.

where $R_t$ is upper bound of the DRBPAV during dry period at period t, and $R_{t'}$ is upper bound of the DRBPAV during dry period at period t+1.

Step 11. Set n=n+1. If n<N, then repeat Step 10; otherwise, go to Step 12.

Step 12. Repeat from Step 9 to Step 11. Determine whether there is any change of reservoir levels of hydropower plants in two adjacent optimization results; if not, then go to Step 13, otherwise repeat Step 12.

Step 13. Reduce the discharge step, and determine whether a new search step meets specified requirements. If so, go to Step 9; otherwise, go to Step 14.

Step 14. Let t=t+1, and if t>T, let k=k+1 and go to Step 15; otherwise, go back to Step 8.

Step 15. Judge whether there is any change of reservoir levels of all hydropower plants in the current iteration; if not, go to Step 16; otherwise, go back to Step 6.

Step 16. Calculate the maximum DRBPAV using $R_{max}$=max{$R_{t'}$}, where t' is a the period set that denotes all months in dry season.

Step 17. If $R_{max}$<R, take operation scheme as a feasible one and then go back to Step 4; otherwise, the calculation stops.

The method proposed in the invention is implemented on the operations of an actual interprovincial hydropower system that is formed relying on the Xiluodu-Zhejiang UHVDC transmission project. Table 1 shows the basic characteristics of hydropower plants considered in the case study. The inflow data is forecasted by 50% frequency based on large amounts of actual data. Table 2 gives optimization results of different schemes. FIG. 4 depicts perato optimal solutions of multi-objective operation.

It can be shown that the method proposed in the invention provides various operation schemes under different values of DRBPAV. These operation schemes present effective trade-off between energy production of hydropower system over a long period and peak response at typical days. FIG. 5 selects five from all operation schemes and presents a comparison with the conventional operation scheme. It can be seen that the average hydropower generation in dry season produced by the present method show an obvious increase. This means the hydropower system can provide more dispatchable power in dry season for power grids. As seen from FIGS. 6 and 7, the obtained operation scheme shows large changes in reservoir levels and power generations of local hydropower plants while keeping those of outer hydropower plants unchanged basically. This indicates the optimized scheme is easy to implement. Therefore, the invention provides a practical and efficient technique method for large-scale hydropower transmission via trans-provincial and -regional UHVDC lines.

TABLE 1

Characteristics of hydropower plants

| Power plant | Unit number | Installed capacity/MW | Regulation ability | River | Flood season |
|---|---|---|---|---|---|
| Shanxi | 4 | 200 | Multi-yearly | Feiyunjiang | 10th April~10th October |
| Jinshuitan | 6 | 305 | Yearly | Oujiang | |
| Shitang | 3 | 85.8 | Daily | Oujiang | |
| Tankeng | 4 | 604 | Multi-yearly | Oujiangxiaoxi | |
| Sanxikou | 3 | 33.3 | Daily | Oujiang | |
| Hunanzhen | 4 | 320 | Multi-yearly | Qiantangjiang | |
| Huangtankou | 2 | 88 | Daily | Qiantangjiang | |
| Xinanjiang | 7 | 827.5 | Multi-yearly | Xinanjiang | |
| Fuchunjiang | 3 | 360 | Daily | Xinanjiang | |
| The left bank of Xiluodu | 9 | 6300 | Seasonally | Jinshajiang | 10th July~10th September |

TABLE 2

Results of different operation schemes using the inflow forecast of 50% frequency.

| Operation scheme | Generating capacity/ $10^8$ kWh | Maximum DRBPAV |
|---|---|---|
| 1 | 360.13 | 0.282 |
| 2 | 360.13 | 0.281 |
| 3 | 360.08 | 0.28 |
| 4 | 360.08 | 0.279 |
| 5 | 360.08 | 0.278 |
| 6 | 360.07 | 0.277 |
| 7 | 360.07 | 0.276 |
| 8 | 360.06 | 0.275 |
| 9 | 360.06 | 0.274 |
| 10 | 360.05 | 0.273 |
| 11 | 360.04 | 0.272 |
| 12 | 360.01 | 0.271 |
| 13 | 359.99 | 0.27 |
| 14 | 359.97 | 0.269 |
| 15 | 359.96 | 0.268 |
| 16 | 359.87 | 0.267 |
| 17 | 359.75 | 0.266 |
| 18 | 359.63 | 0.265 |
| 19 | 359.49 | 0.264 |
| 20 | 359.32 | 0.263 |
| 21 | 359.16 | 0.262 |
| 22 | 359.08 | 0.261 |
| 23 | 359.04 | 0.26 |
| 24 | 358.82 | 0.259 |
| 25 | 358.64 | 0.258 |
| 26 | 358.54 | 0.257 |
| 27 | 358.22 | 0.256 |
| 28 | 357.98 | 0.255 |
| 29 | 357.76 | 0.254 |
| 30 | 357.41 | 0.253 |
| 31 | 356.99 | 0.252 |
| 32 | 356.8 | 0.251 |
| 33 | 356.26 | 0.25 |
| 34 | 355.83 | 0.249 |
| 35 | 355.61 | 0.248 |
| 36 | 355.36 | 0.247 |
| 37 | 354.91 | 0.246 |
| 38 | 354.02 | 0.245 |
| 39 | 353.36 | 0.244 |
| 40 | 352.6 | 0.243 |

We claim:

1. A method for long-term optimal operations of interprovincial hydropower plants considering peak-shaving demands is characterized as the following steps:

step 1, read basic data and initialize calculation parameters, including operation conditions and constraints of hydropower plants, control targets, network constrains about ultra high voltage direct current (UHVDC) transmission lines, monthly average load of recipient power grids, and hourly load curve at the typical day of each month;

step 2, establish an optimization model for long-term operations of interprovincial hydropower plants, with two objectives of maximizing generation production and minimizing the difference rate between peak and valley load (DRBPAV) during dry period;

step 3, determine initial solution of the above model; an optimization problem with one objective of maximizing generation production is solved and its solution is taken as the initial solution; here, the DRBPAV at each typical day of dry season can be calculated and the maximum among them is denoted as $R_0$; upper bound of the DRBPAV during dry period is denoted as R; set $R=R_0$;

step 4, set $R=R_0-0.01$;

step 5, set iteration number k=0;

step 6, let current time period t=1, and define T as total number of time periods during whole operation horizon;

step 7, divide all hydropower plants into N groups;

step 8, this step is carried out while k>0; if there is change in reservoir levels obtained from the two-stage search optimization, reset discharge step and go to step 9; otherwise, update t=t+1; if t>T, go to step 15; Otherwise, repeat the current step;

step 9, judge whether a hydropower plant involved in the calculation is in a flood season; if so, the calculation will be given priority; otherwise, it will be carried out after the plants that are in a flood season are solved; the order of a plant group with the highest priority is defined as n=0;

step 10, process the upper bound of the DRBPAV, transmission limitations, and conventional plant constraints, and utilize a POA-DDDP based method (POA is progressive optimality algorithm and DDDP is discrete differential dynamic programming) to search optimal discharges of two-stage problem at periods t and t+1 with current optimization objective; meanwhile, the load shedding method is used to determine an hourly generation curve at typical days; thus, the $R_t$ and $R_{t+1}$ at periods t and t+1 can be obtained; where $R_t$ is upper bound of the DRBPAV during dry period at period t, and $R_{t+1}$ is upper bound of the DRBPAV during dry period at period t+1;

step 11, set n=n+1; If n<N, then repeat step 10; otherwise, go to step 12;

step 12, repeat from step 9 to step 11; determine whether there is any change of reservoir levels of hydropower plants in two adjacent optimization results; if not, then go to step 13, otherwise repeat step 12;

step 13, reduce the discharge step, and determine whether a new search step meets specified requirements; if so, go back to step 9; otherwise, go to step 14;

step 14, Let t=t+1, and if t>T, let k=k+1 and go to step 15; otherwise, go back to step 8;

step 15, judge whether there is any change of reservoir levels of all hydropower plants in the current iteration; if not, go to step 16; otherwise, go back to step 6;

step 16, calculate the maximum DRBPAV using $R_{max}=\max\{R_{t'}\}$, where t' is a period set that denotes all months in dry season;

step 17, if $R_{max}<R$, take operation scheme as a feasible one and then go back to step 4; otherwise, the calculation stops, wherein the operation scheme is implemented for the long-term optimal operations of the interprovincial hydropower plants.

* * * * *